Aug. 9, 1949.   J. STUART, III   2,478,847
CONVERTIBLE HELICOPTER-AIRPLANE
Filed Oct. 6, 1944   6 Sheets-Sheet 1

INVENTOR
Joseph Stuart III
BY
ATTORNEYS

Aug. 9, 1949.   J. STUART, III   2,478,847
CONVERTIBLE HELICOPTER-AIRPLANE
Filed Oct. 6, 1944   6 Sheets-Sheet 3

INVENTOR
Joseph Stuart III
BY
ATTORNEYS

Patented Aug. 9, 1949

2,478,847

UNITED STATES PATENT OFFICE 2,478,847

CONVERTIBLE HELICOPTER-AIRPLANE

Joseph Stuart, III, Dayton, Ohio, assignor to General Motors Corporation, Detroit, Mich., a corporation of Delaware Application October 6, 1944, Serial No. 557,398

11 Claims. (Cl. 244—7)

This invention relates to aircraft capable of vertical hovering flight and convertable to normal airplane flight, or vice versa, with means for effecting complete control of the craft under either condition, and for effecting translation from either one to the other.

One of the objects of the invention is to provide a craft capable of normal airplane flight that is also capable of hovering flight during take-off and landing, thus obviating the necessity of a ground run.

Another object is to provide an aircraft capable of hovering flight like a helicopter, yet capable of very high speed forward flight, efficiently, as an airplane.

Another object is to provide an aircraft, wing supported in forward flight, capable of hovering flight, in which the lifting rotors' slipstream is unobstructed in hovering by wing or fuselage.

Another object is to provide a high performance aircraft capable of vertical take-off and landing, having a forward view unobstructed by propellers, thus affording a clear forward field of fire for military applications.

Another object is to provide control about transverse and vertical axes in hovering flight by means of a single universally mounted control propeller, axially mounted relative to the fuselage for minimum drag during high forward speed operation as an airplane.

Another object is to provide an aircraft capable of hovering flight, and forward flight, which, in forward flight, becomes an airplane equipped with unusually large diameter propellers (impractical in a conventional airplane because of ground clearance requirements), and thus has high climbing efficiencies down to low forward speeds so that spectacularly great climbing angles are possible in the airplane mode of operation.

Another object is to provide an aircraft capable of hovering and also forward flight as an airplane which in forward flight does not have its wings in the turbulent propeller wake.

Another object is to provide in an aircraft capable of hovering and forward flight as an airplane, a control propeller which in forward flight feathers automatically when its rotation is stopped so as to give minimum drag.

Another object is to provide in an aircraft capable of hovering and forward flight as an airplane, a control propeller which in forward flight gives substantially constant thrust regardless of the forward speed of the craft.

Another object is to provide in an aircraft capable of hovering and forward flight as an airplane, a control propeller which in forward flight feathers automatically when its rotation is stopped so as to give minimum drag, and which gives substantially constant thrust regardless of the forward speed of the craft.

Another object of the invention is to provide an aircraft with a propeller system that can be oscillated through a sufficient angle to effect either hovering flight or normal airplane flight.

A further object of the invention is to provide an aircraft with a propeller system whose line of thrust may be oscillated through sufficient angle to effect both vertical flight and horizontal flight without change of craft attitude, and without blade pitch reversal.

A further object of the invention is to provide an aircraft with a propeller system whose line of thrust is oscillatable through an angle of approximately 90° about the pitch axis of the craft, from a vertical thrust position beneath a sustaining surface to a horizontal thrust position behind the sustaining surface, whereby transition from vertical flight to horizontal flight may be effected.

Another object of the invention is to provide an oscillatable propeller system with blade pitch control means for control of craft attitude.

Another object of the invention is to provide on oscillatable propeller system with self-contained blade pitch altering means, and a master controller for effecting blade pitch alteration in accordance with speed, in any position within the range of propeller system oscillation.

Another object of the invention is to provide an aircraft with laterally spaced oscillatable propeller systems movable from a vertical thrust position beneath the sustaining surfaces to a horizontal thrust position behind the sustaining surfaces, and each system incorporating blade pitch shifting mechanism, with means for controlling the mean blade pitch in accordance with speed and for differentially controlling the blade pitch in accordance with the requirements for lateral control of the craft in hovering operation.

Another object of the invention is to provide an aircraft with dual symmetrically disposed propeller units oscillatable from a direct lift position to a horizontal propulsive position, and blade pitch control means for effecting coincident and equal blade pitch change in all units in accordance with speed in all positions within the range of propeller oscillation, and means for differentially changing the blade pitch of two of the propeller units when in one position within the range of propeller oscillation.

Another object of the invention is to provide a propeller unit oscillatable through a substantial angle with respect to a definite axis of the craft, with the unit embracing a self-contained fluid actuated pitch shifting mechanism that is operable to effect pitch shift in any position of the unit within the range of oscillation.

Another object of the invention is to provide a dual propeller system of an aircraft with a pitch control unit operable to effect coincident and equal pitch change of the blades of both propellers in accordance with speed, and linkage for superimposing aileron adjustment upon the control unit for differential pitch control.

Further objects and advantages of the present invention will be apparent from the following description, reference being had to the accompanying drawings wherein preferred embodiments of the present invention are clearly shown.

In the drawings:

Fig. 1 illustrates the propeller system arranged for normal airplane flight in which the propeller units are adjusted to a position behind the sustaining surfaces of the craft, while Figs. 2 and 3 illustrate the propeller system adjusted to the position for take-off and landing with the propeller units depending beneath the sustaining surfaces.

With specific reference to the drawings, and first considering Figs. 1, 2 and 3, 10 indicates the fuselage of the craft provided with the usual sustaining surfaces or wings 12, in each of which is mounted a propeller unit 14 connected by cross shafting 16 and gearing 18 with a motive unit, such as an engine, generally indicated at 20. As shown, the engine 20 is enclosed in the forward portion of the fuselage and a shaft extension 22 and torque control unit 24 couples the engine with a universally mounted control prop 26 at the extreme rear end of the fuselage, where it is coordinated with the movement of control surfaces, such as the rudder 28 and elevators 30. The propeller units 14 each comprise a hub 32 to which are secured for pitch changing movement, a plurality of blades 34, a propeller shaft 36 mounting the hub and blades extending axially of the propeller disc to provide a gear 38 meshing with another gear or pinion 40 driven by the cross shafting 16, and trunnioned within the wing or sustaining surface 12. The trunnions on the propeller drive head 42 provide for swinging the propeller unit around its trunnions from a lifting thrust position shown in full lines in Figs. 2 and 3 and in dotted lines of Fig. 1 to the horizontal thrust or normal flight position shown in full lines in Fig. 1. At the outward end of the propeller unit, or that end remote from the trunnioned driving head, a cushion member or shock absorber 44 is provided for ground engagement when at rest and for fairing the aft portion of the propeller unit while in flight. Toward the same end telescopically collapsible struts 46 and 48 are fixed beneath the fuselage 10 to assist in absorbing the shock on landing. For more detailed consideration of the structure involved in the propeller units and their control, reference is now made to Figs. 4 thru 7 for structure, and to Figs. 8 and 9 for control.

Figure 4:
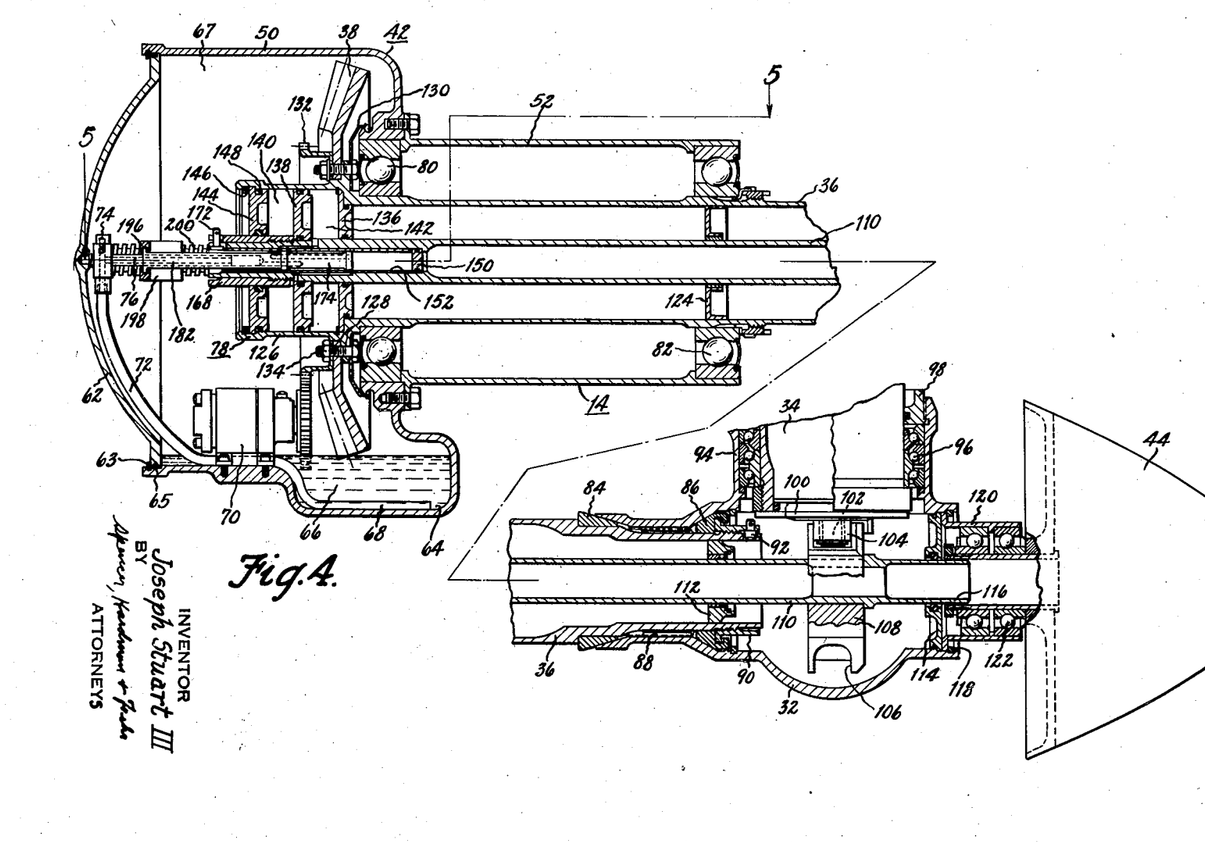
Fig. 4 is a longitudinal sectional view of a propeller unit, substantially as indicated by the line and arrows 4—4 of Figs. 1 and 5.

The propeller drive head 42 comprises a casing 50 mounted on a barrel member 52 having arms 54 and 56 with hollow boses trunnioned at 58 and 60 to the framework of the sustaining surfaces. A cover 62 closes off the housing and provides a gear casing for the elements 38 and 40, and an enclosure for the pitch shifting mechanism of the respective propeller. A snap ring 63 and a seal 65 secures the cover 62 in fluid tight relation, so that the housing 50 and cover 62 also form a fluid reservoir 67 for the operating fluid by which the pitch shifting is actuated. The casing 50, to assist in that function, is provided with a sump 64 receptive of a quantity of oil or fluid pressure medium 66 which may also enter into lubrication of the parts. The sump is so designed as to occupy the lowermost portion of the casing 50 whether the propeller unit be oscillated to the vertical or the horizontal position, and therefore always presents a sufficient quantity of fluid 66 to the intake 68 of a pump 70. The pump has a fluid delivery line 72 for delivering fluid under pressure to a high pressure relief valve 74 and thence to a transfer tube 76 communicating with the pitch shifting unit 78, as will be presently described. An alternative is to incorporate a relief valve in the pump 70, or it may be supplemented by the valve 74.

The barrel 52 of the propeller driving head provides friction reducing bearings 80, 82 for journalling the propeller shaft 36, which is hollow and extends from the driving head 42 to the propeller hub 32, where the hub is secured on the shaft end in the conventional manner by the cone rings 84 and 86, and splines 88 maintained in driving relation by nut 90 and lock device 92. The hub 32 provides a plurality of radiating sockets 94 journalling the blades 34 by means of stack bearings 96, where they are retained by blade nuts 98. An end member 100 secured rigidly within the end of the blade 34 provides a crank pin 102 offset from the rotary axis of the blade and supports a roller 104 disposed in a notch 106 of a spider member 108 carried by a pitch shifting member 110 movable lineally of the propeller shaft 36. A gland 112 within the end of the shaft 36 guides the shifting member 110 centrally of the shaft, and an annular plate 114 within the aft end of the hub 32 supports an extended end 116 of the member 110. Appropriate lubricant seal means is provided in each instance, and the plate 114 is held in place by a snap ring 118 which also engages the flange of a sleeve 120 supporting friction reducing bearings 122 forming a freely rotatable support for the landing cushion 44.

The pitch shifting member 110 extends centrally of the shaft 36 to a point within the propeller driving head 42 where union is made with the pitch shifting servo 78, the shaft assembly being journalled within the barrel 52 by the friction reducing bearings 80 and 82, an internal ring 124 located within the shaft 36 being apertured for the longitudinal movement and guidance of the pitch shifting member 110. A hollow enlargement of the shaft 36 ending within the housing 50 provides a servo cylinder 126 for the unit 78, and a radial flange 128 makes for mounting the gear 38, a slinger ring 130 and also a pump driving gear 132, all of which are held in rigid relation by the screw devices 134. The bottom of the cylinder 126 is closed off by a head member 136 apertured to pass the pitch shifting member 110 and upon which is secured a piston head 138 designed to slide within the cylinder 126 and divide it into two chambers 140 and 142 subjected under certain conditions to inflow and outflow of fluid 66 under pressure. The open end of the cylinder 126 is removably closed off by a head member 144 centrally apertured for the passage of the shifting member extension, and held in place by a snap ring 146. Fluid pressure seals are provided where deemed desirable or necessary such as indicated at 148, and may consist of a compressible rubber-like ring confined within a groove.

Figures 5, 7:
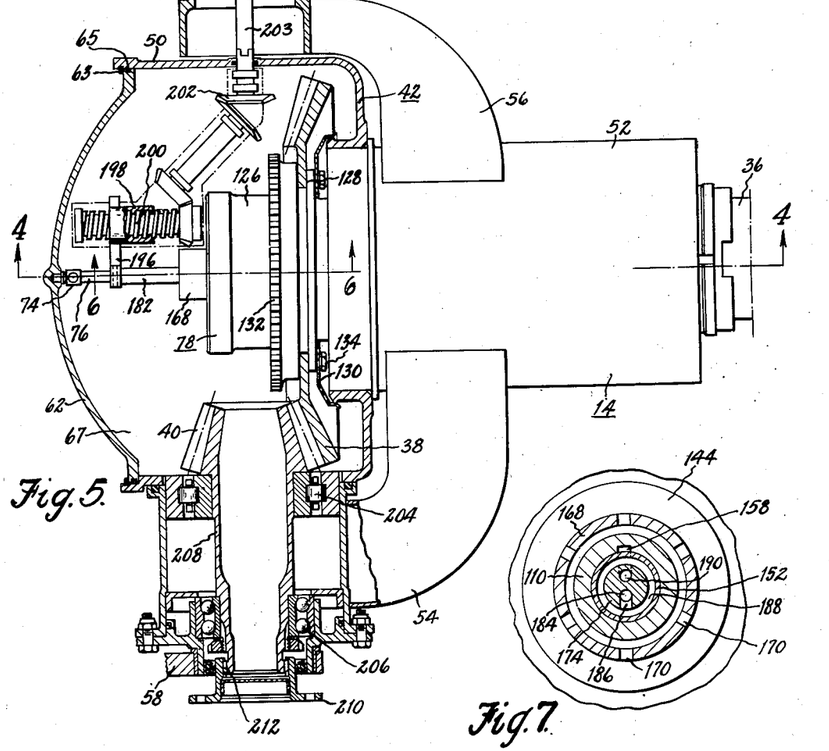
Fig. 5 is a sectional view at right angle thereto substantially as indicated by the line and arrows 5—5 of Fig. 4.
Fig. 7 is a cross sectional view of the valving means as suggested by the line and arrows 7—7 of Fig. 6.
Figure 6:
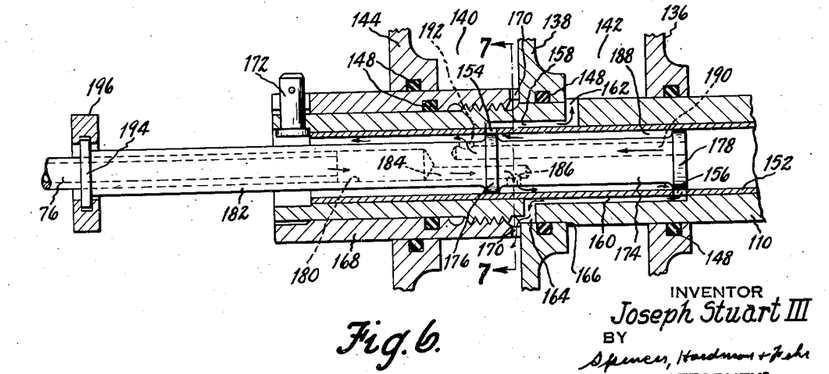
Fig. 6 is a sectional view of the pitch control valve on an enlarged scale for clearness, being a view substantially as indicated by the line and arrows 6—6 of Fig. 5.

Directed application of fluid under pressure to one or the other of the chambers 140 or 142 is accomplished by structure more clearly illustrated in Figs. 5, 6 and 7, where it is noted that the bore of the pitch shifting member 110 is closed off at 150 as shown in Fig. 4 to provide a valving cylinder that is lined with a porting sleeve 152 providing lineally spaced ports 154 and 156 that open into channels 158 and 160 respectively, between the outside of the liner 152 and the member 110. The member 110 is so fashioned by means of cross bores 162 and 164 and the like that the passages 158 and 160 will always be open to the chambers 142 and 140 respectively. In mounting the piston head 138 upon the member 110, it is seated against a shoulder 166 of the member 110 where it is secured by a sleeve nut 168 threaded thereon and having a castellated end with notches 170 that engage the piston. In that way the passage 160 opens through the notches 170 to the chamber 140. To maintain the sleeve nut in place a lock pin 172 may be adopted and at the same time operate to prevent endwise movement of the porting sleeve 152 within the member 110. Thus, upon directing fluid pressure to either of the chambers 140 or 142 the pitch shifting member 110 is caused to slide lengthwise of the propeller shaft and in doing so carry the piston 138, the member 110 sliding within the head 136 while the sleeve nut 168 slides within the head 144.

For selecting the direction of this sliding movement a plunger valve 174 is provided with lands 176 and 178 spaced normally to cover the ports 154 and 156 respectively of the porting sleeve. A large concentrically axial bore 180 lengthwise of an extension 182 makes for telescopic sliding and rotary movement about the end of the transfer tube 76, and an offset drillway 184 extends from the bottom of the bore 180, radially inward of the land 176 to a cross-bore 186 opening to the waist 188 between the lands. Similarly, an offset axially directed bore 190 from the opposite end of the plunger valve 174 extends beneath both lands to a cross-bore 192 opening to the outside of the extension 182. An end flange 194 of the valve extension 182 is engaged by a yoke member 196 provided on a nut 198 movable along a high lead screw device 200 in accordance with control functions delivered to a geared connection 202, entering the propeller driving head by a rod 203 concentric with one of the journals 60 for propeller unit oscillation. The opposite journal for the trunnion mount, provides a roller bearing 204 and a double ball bearing 206 for journalled rotation of a tubular stub shaft 208 supporting the pinion 40. A coupling flange 210 is mountable or coupled with the cross shafting 16 and has such splined connection 212 with the stub shaft 208 as to provide a flexible drive within limits between the shafting 16 and the pinion 40.

Figure 8:
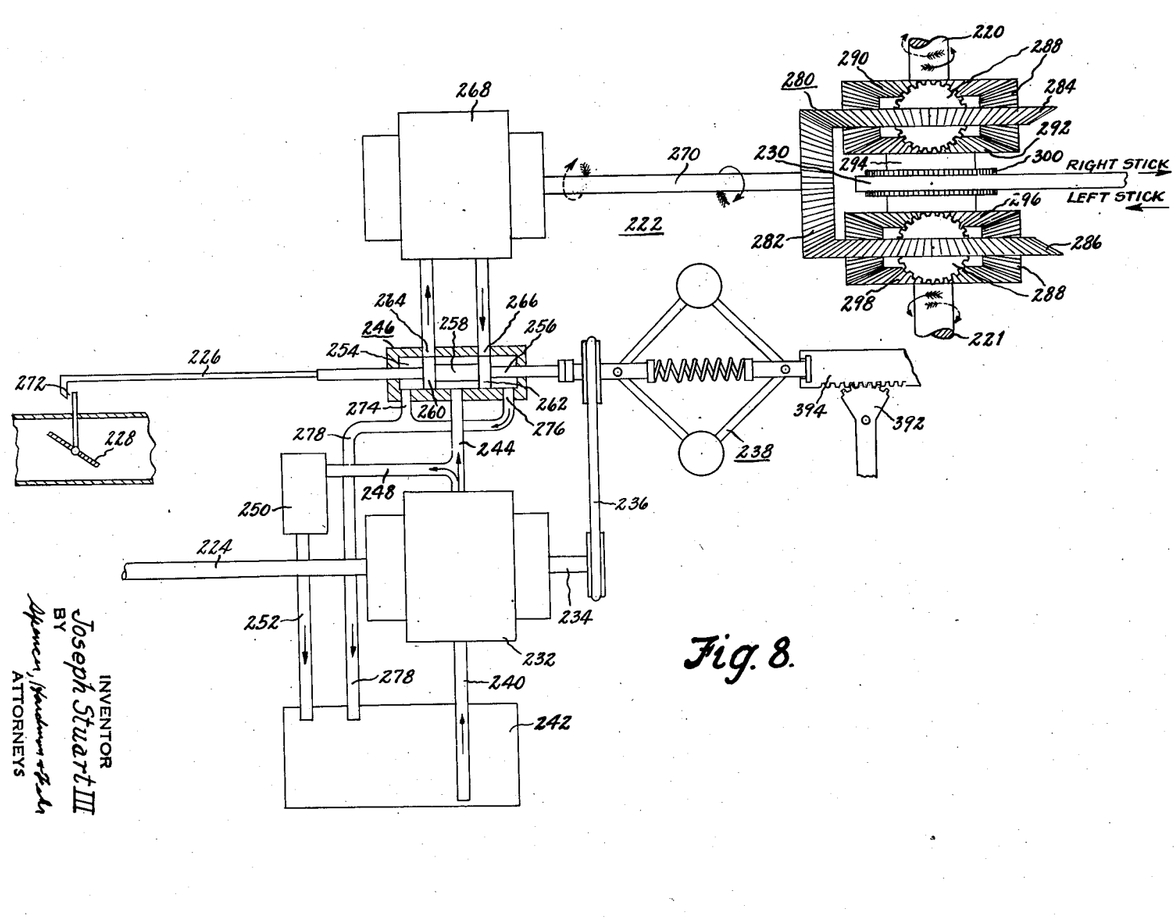
Fig. 8 is a schematic view of the pitch control unit embodied in my invention.
Figure 9:
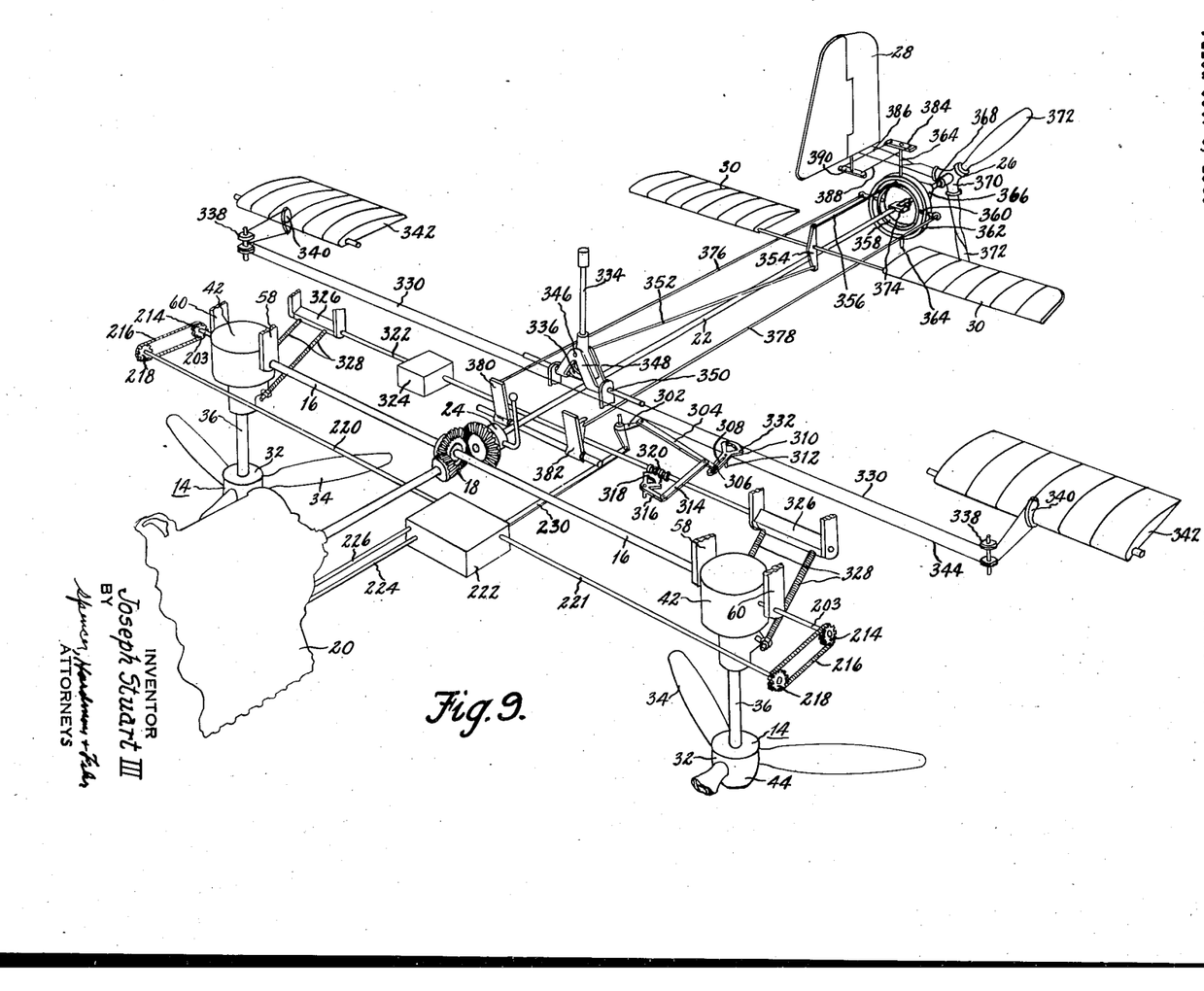
Fig. 9 is a structurally graphic layout of the control mechanism by which the present invention is secured.

Directed shifting of the valve 174 is accomplished by rotation of the rods 203 which work the geared connection 202 to shift the nut 198 along the high lead screw 200 which causes the valve plunger to move inward or outward of the porting sleeve 152. To rotate the rods 203 in either direction, they are fitted each with sprockets 214 and chains 216, or the equivalent, trained over driving sprockets 218 on the ends of pitch control shafts 220 and 221 extending from either side of a pitch control unit 222, as shown in Fig. 9, and detailed in Fig. 8.

The control unit 222 may be located in the fuselage 10, and has a drive shaft extension 224, connecting it with the power plant 20, a linkage 226 to the throttle valve 228 of the power plant, and a differential pitch input control rod 230 articulated and correlated with certain control surfaces of the craft. Referring particularly to Fig. 8, the engine driven shaft 224 actuates a hydraulic pump 232 and has an extension 234 belted or otherwise geared by 236 to drive a governor device 238. The intake side of the pump 232 is at 240 from a reservoir 242, and the fluid therefrom is delivered by outlet 244 to a governor controlled valve 246, a branch 248 leading to a pressure relief valve 250 whose return 252 leads back to the reservoir 242. The governor controlled valve 246 consists of a valve chamber 254 within which slides a valve plunger 256 in response to varied rotation of the governor device 238. The plunger 256 comprises a waist portion 258 lineally spacing two lands 260 and 262 which in the equilibrium position normally cover each a control port 264 and 266 respectively, that lead to opposite sides of a fluid motor 268, adapted to selectively rotate a shaft 270 in opposite direction. The valve plunger 256 is extended to operatively connect to the linkage 226 having a one-way operative connection with the engine control valve 228, such as at 272. Lineal movement of the valve plunger 256 in either direction from the equilibrium position will apply the fluid pressure applied to the waist portion 258 through the connection 244 to either one of the control ports 264 or 266. That causes operation of the motor in one direction or the other, with a return of the pressure fluid through the other of the ports 264 or 266 and thence by drain ports 274 or 276 to the passage 278 returning to the reservoir 242. In Fig. 8, the valve parts are shown in the equilibrium position, but the fluid circuit is shown by means of arrows to indicate the direction of flow when the valve plunger 256 is shifted to the left hand side of the figure, as in the instance of a condition of under speed. The unit is self correcting through rotation of the shaft 270 to drive a pitch control gearing 280 whose output drives the pitch control shafts 220 and 221. If the shafts 220 and 221 are rotated in opposite directions, a mean pitch shift of the two propeller systems is accomplished which will alter the pitch in accordance with the speed when it is effected by means of the governor device 238. If the shafts 220 and 221 are rotated in the same direction, a differential pitch shift of the two propeller units is accomplished which will give lateral control under hovering conditions as will presently appear.

Specifically, the pitch control gearing 280 comprises a pinion 282 driven by the shaft 270, that meshes with a pair of ring gears 284 and 286, each supporting a plurality of idling pinions 288. The pinions 288 of the ring gear 284 each mesh with a gear 290 fixed to the shaft or rod 220, and also with a gear 292 of a drum 294 that has a gear 296 meshing with each of the pinions 288 of the other ring gear 286, these pinions 288 in turn meshing with a gear 298 affixed to the rod or shaft 221. The drum 294 rigidly connects both gears 292 and 296, but has a spur gear 300 integral therewith that has toothed engagement with the pitch input control rod 230 hereinbefore mentioned.

It has been pointed out that the arrows in the fluid passages indicate the fluid circuit through the governor control valve 246 when there is a condition of underspeed. That condition comes about when the propeller load overbalances the power output of the engine, which slows down the engine and consequently effects the collapse of the governor device 238 which shifts the valve 256 toward the left of Fig. 8. That shift effects a correcting influence by admitting fluid pressure to the motor 268 through the port 264 to rotate the shaft 270 in the direction of the dashed-line arrow, calling for a decrease of the mean blade pitch. The shaft rotation for increase pitch adjustment is indicated by the full-line arrows. The pinion 282 on the shaft 270 rotates both of the ring gears 284 and 286 in opposite directions which carry with them the pinions 288. Referring to Fig. 8, for a pitch decreasing shift, the top of the ring gear 284 will move toward the left of the figure carrying with it the pinions 288, causing them to revolve about the axis of the shaft 220 in a counterclockwise direction, while the ring gear 286 will rotate toward the right and effect the clockwise revolution of the supported pinions 288. While that is taking place, the drum 294 with its gears 292 and 296 remain as a fixed element, whereby the pinions 288 rolling thereover cause the shafts or rods 220 and 221 to rotate with an accelerated motion in the direction of the dashed arrows there applied. That rotary motion of the rods 220 and 221 is transmitted to the shaft elements 203, and thence by the gearing 202, 200, 198, 196 and 194 to the valve member 174, whose shift directs the pressure fluid 66 to move the piston 138 for decreasing the pitch of the blades 34, as has been explained.

Governed pitch change is operative in all of the oscillated positions of the propeller units. The drum 294 is normally maintained as a fixed element by the differential input control rod 230. In the illustrated embodiment that linkage includes a bell-crank 302 to which is pivoted a link 304 with a pin 306 sliding in a slot 308 of a lever 310 pivoted at 312. A link 314 pivoted to the end of the link 304 connects with an arm 316 of a toothed segment 318 meshing with a worm 320 on a propeller oscillating shaft 322. A motor and gear reduction unit is provided, such as at 324, for rotating the shaft 322 in either direction, and works through the mechanism at 326 for operating the screws 328 to oscillate the heads 42. The linkage and leverage is such that when the propeller units are in the extended position for hovering flight as shown in Fig. 9, the free or pinned end of the link 304 will be drawn out to the remote end of the slot 308 of the lever 310 such that any oscillation of that lever about its pivot 312 will effect reciprocatory movement of the differential pitch control rod 230. Differential pitch control being desirable only while the propeller units are in the extended position, then retraction of the propeller units to the normal airplane flight position will operate through the worm 320 and segment 318 to shift the pinned end of the link 304 to the inward end of the slot 308, whereby oscillation of the lever 310 will have no effect upon the input member 230. For oscillating the lever 310 in correlation with control surfaces, such as the ailerons, one lay 330 of their control cable is connected to a quadrant 332 of the lever, so that a pull on the cable in either direction will oscillate the lever 310. If the pin 306 is in the outward end of the slot 308, then the link 304 will be moved endwise and the bellcrank rotated to reciprocate the input member 230. Reverting to Fig. 8, movement of the member 230 will effect rotation of the drum 294. If it is assumed that the governor valve plunger 256 is in the equilibrium position, then there will be no movement of the pinion 282 nor of the ring gears 284 and 286. Rotation of the drum 294 will then cause the pinions 288 to rotate the gears 290 and 298 in a direction the reverse of drum rotation. Both shafts 220 and 221 rotating in the same direction set up a differential pitch change, because one of them is rotating for pitch increase adjustment while the other is rotating for pitch decrease adjustment. Thus, while the propeller units are in the extended or lifting position, they are controlled in accordance with the speed by the unit 222, and are also differentially controlled in response to movement of the ailerons, which is superimposed upon the governed control.

Aileron control is effected by lateral movement of the conventional stick 334 whose quadrant 336 is attached to the cable 330 trained over pulleys 338 and attached to arms 340 affixed to the ailerons 342. The return cable for the ailerons is marked at 344, and the linkage is such that swing of the stick 334 for effecting an increased lift, by say the right aileron 342, when the propeller units are in the extended position, will also actuate the differential pitch control member 230 to call for an increased pitch in the blades of the right-hand propeller, with a decrease in the pitch of the left-hand propeller unit. For accomplishing that shift the stick 334 is pivoted for lateral swing at 346 in a yoke 348, that in turn is pivoted at 350 for fore and aft swing. A rod 352, connected with the yoke 348, so as to be actuated by fore and aft swing of the stick, links with a rocker 354 for control of the elevators 30, and a link 356 connects the rocker 354 to one side of an inner gimbal ring 358 secured on a horizontal hinge 360 provided by an outer gimbal ring 362 mounted on vertical hinges 364 supported by the fuselage 10. The inner gimbal ring 358 is extended rearwardly to form a coned head 366 for journalling a shaft 368 on which is mounted a hub 370 securely mounting a plurality of pitch shiftable blades 372 of the universally mounted control propeller 26. A universal joint 374 connects the shaft 368 with the shaft 22 so that the control propeller 26 is driven from the impulse of the engine 20.

Vertical control of the propeller 26 is effected by the forward and backward swing of the stick 334 in the sense that swing of the stick to obtain greater lift by the elevators 30 will tilt the propeller 26 to give an upward thrust for assisting the elevators. Lateral control of the propeller 26 is effected by means of rods or tubes 376 and 378 connected to opposite sides of the outer gimbal ring 362 and that lead to rudder pedals 380 and 382 respectively pivoted at an accessible position near the stick 334. Movement of either pedal 380 or 382 swings the gimbal ring assembly and the control propeller supported thereby about the vertical hinge 364, the upper extent of which has a cross-arm 384 connected by cables 386 and 388 with a rock-arm 390 on the pivotal extension of the rudder 28. That linkage is such that depression of one of the pedals for movement of the rudder 28 to effect a desired lateral control of the craft will also swing the propeller 26 such that its thrust will tend to swing the tail end of the craft in the same direction.

During operation of the craft, the two primary propellers are driven at equal speeds in opposite directions by the engine through the bevel gearing shown. The propeller shaft axes may be rotated or oscillated together about their tilt axis through the approximately 90° range indicated. The primary propellers are of the servo type wherein setting of their final control calls for a definite blade angle setting. The mean pitch of these propellers is controlled by a governor to give a desired constant engine speed; the quadrant 392 and rack 394 in their adjustment selecting the speed level at which the propeller system will be regulated for constant speed. The governor sets the mean pitch of the two propeller units, while differential pitch settings may be applied when the propeller shaft axes are at or near the hovering angles, to effect aileron control equivalent under hovering conditions by the thrust difference between the two propellers differentially set to different pitches.

Under hovering conditions, rudder and elevator control are maintained, in effect, by having the universally mounted control propeller's axis tilted in the same direction that the elevators and rudder are pointed in their respective planes. The tail propeller 26 may be a high pitch, high solidity propeller giving the necessary hovering control force, yet unloading without creating any drag at high forward speeds. The power input to this propeller should be very small as only light forces are required compared to the large forces required of the torque balance propellers used on single rotor helicopters.

Figures 10, 11, 12, 13:
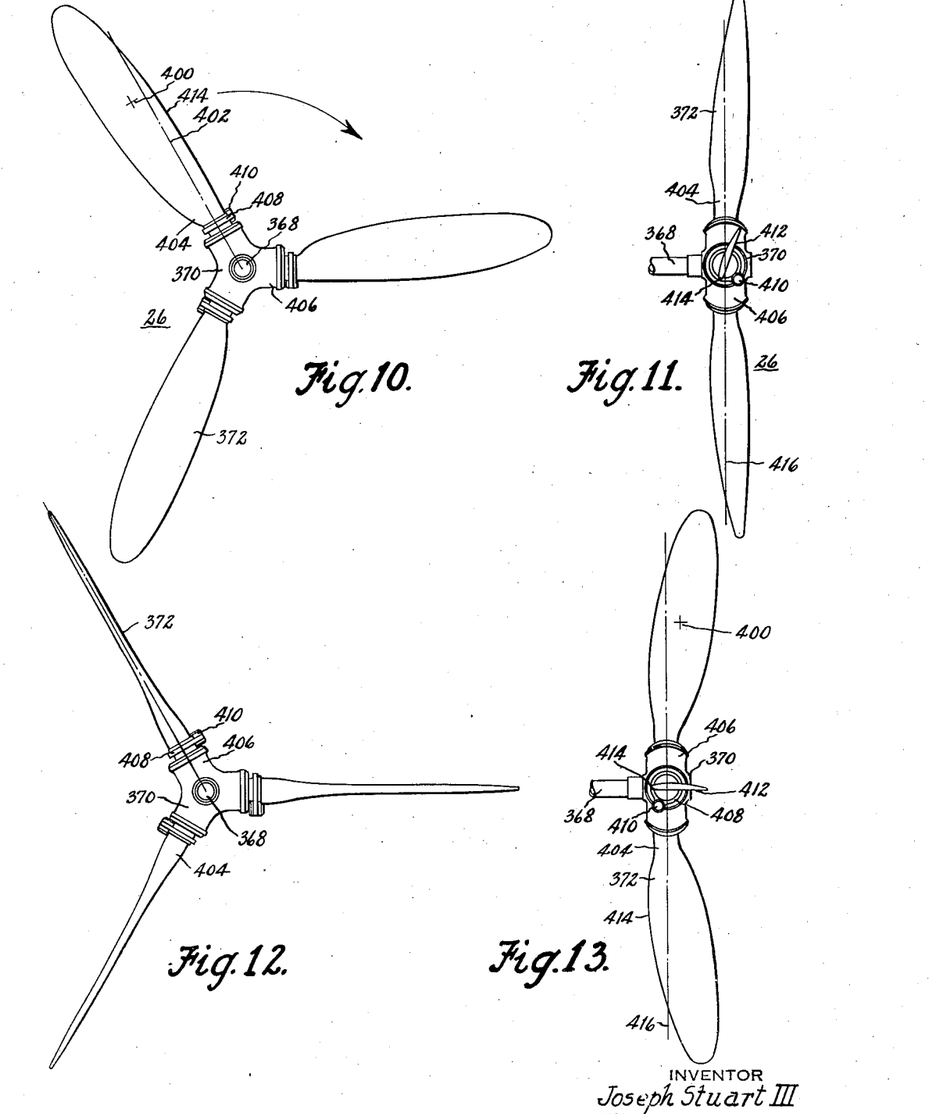
Fig. 10 is an end view of the control propeller in the active, low pitch position, looking aft from the fuselage.
Fig. 11 is a side view of the same.
Fig. 12 is an end view of the control propeller in the inactive or feathered or trailing position, also looking aft from the fuselage.
Fig. 13 is a side view of the same, also showing the plan form of the blades for the control propeller.

A preferred form of control propeller is shown in Figs. 10 to 13, in which the blades 372 of asymmetric form have their centers of pressure 400 located on the trailing edge side of the axis of blade pitch rotation 402, and have their shank or root ends 404 journalled for free rotation in sockets 406 of the hub 370, by a stack of bearings similar to the bearings 96 for the blades 34 in the primary propeller, substantially as shown in Fig. 4. Secured to the root 404 of each blade just radially outward of the socket 406 is a bracket 408 that carries a weight or mass 410 disposed or oriented to a position on the thrust face side 412 of and adjacent to the leading edge 414 of the blade, substantially as shown in Figs. 11 and 13. While the blades are freely rotatable in their sockets 406, they include coordinating linkage, one with another within the hub, such as the usual blade gears and master gear, for effecting an equalized change of all blades.

Figure 1:
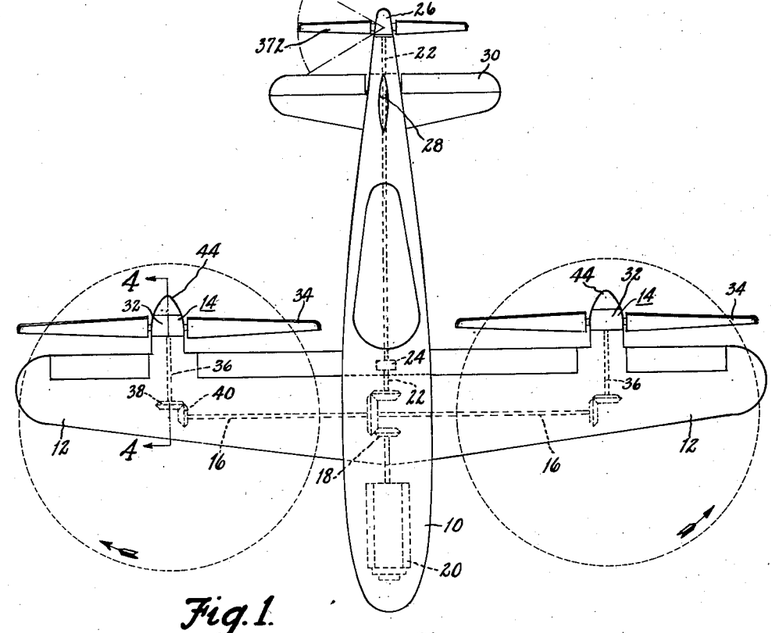
Figs. 1, 2 and 3 are plan, front and side views, respectively, of an aircraft embodying my invention.
Figure 2:
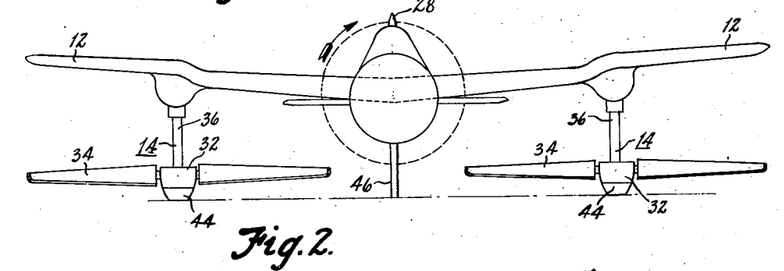
Figure 3:
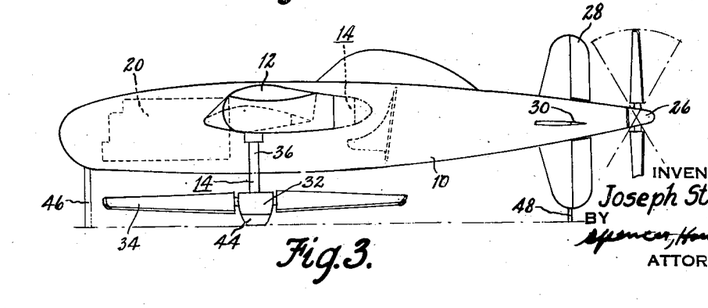

As viewed from the slipstream, the control propeller is a left-hand pusher. By cocking the propeller sideways, up and down, or to some combination of the two, the necessary component of thrust (in the direction of propeller tilt) can be produced to keep the aircraft properly orientated. The range of control propeller cocking includes an angle of approximately 30° in any direction from the longitudinal axis of the craft, substantially as indicated in Figs. 1 and 3. As soon as enough forward speed is attained to make the tail surfaces effective, the propeller blades feather to minimum drag position as shown in Figs. 12 and 13. The blades are built with an airfoil cross-section and with considerable offset toward the trailing edge as shown in Figs. 10 and 13, so that (1) they will automatically feather when the propeller is de-clutched during high forward speeds, and (2) they can be made to change angle with variation in thrust.

During operation the centrifugal twisting moment on the blades alone is toward low pitch in which the blades tend to align their chords with the disc of propeller rotation 416, but counterweights 410 are added to give a maximum resultant increase pitch moment at a desired angle range, say from 15 to 20 degrees where the static thrust of the propeller would be greatest for a minimum power input. In this range the thrust (acting on the offset center of pressure 400) would counteract the increase pitch moment and seek an equilibrium blade angle somewhat as shown in Fig. 11.

The propeller rotational speed remains constant but power is unlimited so the propeller produces constant thrust, substantially over a limited range since the blade angle will keep increasing to balance the increase and decrease pitch moments as higher forward speed is attained. As soon as the operating blade angle is above the range, constant thrust is no longer obtained; but by this time the relative wind over the tail surfaces will have become high enough to make the control propeller unnecessary. It may then be de-clutched and allowed to feather to the position shown in Figs. 12 and 13.

The primary propeller units have relatively rotatable shaft extensions serving as landing struts, and are provided with end pads to cooperate with collapsible shock struts on the fuselage. In operation of the craft, while in the hovering ground position indicated in Figs. 2 and 3, power is applied to drive the propeller units 14 until the desired vertical ascent is made. When the desired altitude has been reached the craft will be inclined forward which may be accomplished by manipulation of the stick 334 which with the propellers still in the extended position supporting the craft, will enable the craft to pick up a good forward speed. When the forward speed is sufficient for the wing surfaces 12 to support the craft, the primary propellers will be tilted or oscillated to their airplane flight position, after which flight proceeds as a conventional airplane. In the transition from normal airplane flight to hovering flight, the propeller units are oscillated to the hovering position and, as the craft is slowed down by raising its nose, power is applied to keep the flight path level. By appropriately controlling the throttles of the engine, a slow controlled vertical descent may be made. Should there be a tendency for excessive overspeed operation, the opening of the throttle valve 228 will be reduced as the governor valve plunger 256 moves to the right of Fig. 8 in calling for an increased pitch adjustment. Minimum changeover speed may be had by use of wing flaps where needed.

The primary propeller units being located below the wings during hovering, their inflow which is at very low velocity, is not seriously blocked. If the propellers were above the wing much lift would be lost due to the drag of the wing in the slipstream.

While the embodiments of the present invention as herein disclosed, constitute preferred forms, it is to be understood that other forms might be adopted, all coming within the scope of the claims which follow.

What is claimed is as follows:

1. An aircraft comprising in combination, a fuselage with a longitudinal axis, sustaining surfaces arranged on a transverse axis, control surfaces supported by the fuselage and the sustaining surfaces, manual means for actuating the control surfaces to control the stability of the craft in pitch, roll and yaw, a pair of propeller units each trunnioned on the craft transverse axis on either side of the fuselage, means for oscillating the propeller units on the trunnions to and from a vertical thrust position from and to a horizontal thrust position without material change in attitude of the craft, speed responsive pitch control means operable to effect constant speed operation of the propeller units in all positions of oscillation, a universally mounted control propeller at the aft end of the longitudinal axis, means for correlating the tilt of the control propeller with the inclination of certain of the control surfaces, differential pitch control means for imparting differential pitch change to said propeller units, common means for moving other selected control surfaces and for actuating said differential pitch control means, and means responsive to swiveling of said propeller units for rendering ineffective said differential pitch control means when said propeller units are in the horizontal thrust position.

2. An aircraft comprising in combination, a fuselage with a longitudinal axis, sustaining surfaces arranged on a transverse axis, control surfaces supported by the fuselage and the sustaining surfaces, manual means for actuating the control surfaces to control the stability of the craft in pitch, roll and yaw, a pair of controllable pitch propeller units, each propeller unit being trunnioned on opposite sides of the fuselage for oscillation about the transverse axis from a downward thrust position beneath the sustaining surfaces to a horizontal rearward thrust position behind the sustaining surfaces, pitch control means for effecting constant speed operation of both propeller units in all positions, and means arranged so as to be brought into operative position by oscillation of the propeller units to the vertical thrust position for effecting a differential pitch shift of the propeller units coincident with actuation of some of the control surfaces.

3. An aircraft comprising in combination, a fuselage with a longitudinal axis, sustaining surfaces arranged on a transverse axis, control surfaces supported by the fuselage and the sustaining surfaces, manual means for actuating the control surfaces to control the stability of the craft in pitch, roll and yaw, a pair of controllable pitch propeller units, each propeller unit being trunnioned on opposite sides of the fuselage for oscillation about the transverse axis from a downward thrust position beneath the sustaining surfaces to a horizontal rearward thrust position behind the sustaining surfaces, each propeller unit comprising individual pitch shifting means for altering the blade inclination of the respective propeller, a centralized pitch control unit including a pair of pitch control output members, means for transmitting movement of the output members to the individual pitch shifting means, said pitch control unit normally effecting mean blade pitch alteration for constant speed operation of both propeller units in both the downward thrust position and the rearward thrust position, and differential pitch input control means coupled with movement of some of the control surfaces for effecting differential pitch shift in the propeller units in coordination with the movement of said some control surfaces when the propeller units are in the downward thrust position, the individual pitch shifting means comprising a fluid pressure system incorporating a cylinder, a piston movable within the cylinder, a control valve for directing fluid pressure to the cylinder on either side of the piston, a fluid pressure source, and a pitch control input member.

4. An aircraft comprising in combination, a fuselage with a longitudinal axis, sustaining surfaces arranged on a transverse axis, control surfaces supported by the fuselage and the sustaining surfaces, manual means for actuating the control surfaces to control the stability of the craft in pitch, roll and yaw, a pair of controllable pitch propeller units, each propeller unit being trunnioned on opposite sides of the fuselage for oscillation about the transverse axis from a downward thrust position beneath the sustaining surfaces to a horizontal rearward thrust position behind the sustaining surfaces, each propeller unit comprising individual pitch shifting means for altering the blade inclination of the respective propeller, a centralized pitch control unit including a pair of pitch control output members, means for transmitting movement of the output members to the individual pitch shifting means, said pitch control unit normally effecing mean blade pitch alteration for constant speed operation if both propeller units in both the downward thrust position and the rearward thrust position, and differential pitch input control means coupled with movement of some of the control surfaces for effecting differential pitch shift in the propeller units in coordination with the movement of said some control surfaces when the propeller units are in the downward thrust position, the centralized pitch control unit comprising a governor valve, a source of fluid pressure lead to the governor valve, a reversible fluid motor, and a differential gearing coupling the fluid motor with pitch output control members, said governor valve acting in response to change in propeller speed to selectively direct fluid pressure to the fluid motor.

5. An aircraft comprising in combination, a fuselage, a pair of sustaining surfaces extending transverse of the fuselage, control surfaces for maintaining stability of the craft, manually selective means for actuating the control surfaces, an oscillatable propeller unit symmetrically disposed on each side of the fuselage and trunnioned on a transverse axis in the respective sustaining surface, means for oscillating the propeller units through a range of approximately 90° from a vertical thrust position beneath the sustaining surfaces for take-off and hovering flight to a horizontal thrust position behind the sustaining surfaces for horizontal flight, centralized pitch control means for effecting mean pitch shift of propeller blade inclination in any oscillated position of the propeller units, differential pitch control means actuated by selected operation of the manual control means for differentially controlling the blade inclination of said propeller units in the vertical thrust position, and means actuated by oscillation of the propeller units to the vertical thrust position for coupling the differential pitch control means with certain selected control surface movement and actuated by oscillation of the propeller units to the horizontal thrust position for uncoupling the differential pitch control means and the control surface movement.

6. An aircraft comprising in combination, a fuselage, a pair of sustaining surfaces extending transverse of the fuselage, control surfaces for maintaining stability of the craft, manually selective means for actuating the control surfaces, an oscillatable propeller unit symmetrically disposed on each side of the fuselage and trunnioned on a transverse axis in the respective sustaining surface, means for oscillating the propeller units through a range of approximately 90° from a vertical thrust position beneath the sustaining surfaces for take-off and hovering flight to a horizontal thrust position behind the sustaining surfaces for horizontal flight, a control propeller, means mounting the control propeller at the aft end of the fuselage for universal tilting of its line of thrust with respect to the longitudinal axis of the fuselage, means correlating the tilt of the control propeller with the actuation of selected control surfaces for effecting pitch and yaw control of the craft, differential pitch control means for imparting differential pitch change to said propeller units, common means for moving other selected control surfaces and for actuating said differential pitch control means, and means responsive to swiveling of said propeller units for rendering ineffective said differential pitch control means when said propeller units are in the horizontal thrust position.

7. An aircraft comprising in combination, a fuselage, a pair of sustaining surfaces extending transverse of the fuselage, control surfaces for maintaining stability of the craft, manually selective means for actuating the control surfaces, an oscillatable propeller unit symmetrically disposed on each side of the fuselage and trunnioned on a transverse axis in the respective sustaining surface, means for oscillating the propeller units from a downward thrust position beneath the sustaining surfaces to an aft thrust position behind the sustaining surfaces, centralized pitch control means for coincidentally altering the pitch of the blade of both propeller units, a control propeller universally mounted at the aft end of the fuselage, power means for driving the propeller units and the control propeller, means coupling the pitch control means with the power means for effecting constant speed operation of the propeller units, means coupled with said manually selective means for correlating tilt of the control propeller with the movement of selected control surfaces and for differentially controlling the blade pitch of the propeller units, said pitch control means including differential pitch control means for imparting differential pitch change to said propeller units, common means for moving other selected control surfaces and for actuating said differential pitch control means, and means responsive to swiveling of said propeller units for rendering ineffective said differential pitch control means when said propeller units are in the horizontal thrust position.

8. In an aircraft having transversely extending sustaining surfaces and propeller units oscillatable from a vertical thrust position beneath the sustaining surfaces to a horizontal thrust position behind the sustaining surfaces, the combination of pitch shiftable blades on each of said propeller units, pitch shifting means in each propeller unit for shifting the pitch of said blades in all oscillated positions of the propeller units, and a centralized pitch control unit operable upon the pitch shifting means for effecting constant speed operation of said propeller units, the pitch shifting means comprising a fluid pressure cylinder, a piston within the cylinder, means connecting the piston with the pitch shiftable blades, and a control valve for directing fluid under pressure to either side of the piston.

9. In an aircraft having transversely extending sustaining surfaces and propeller units oscillatable from a vertical thrust position beneath the sustaining surfaces to a horizontal thrust position behind the sustaining surfaces, the combination of pitch shiftable blades on each of said propeller units, pitch shifting means in each propeller unit for shifting the pitch of said blades in all oscillated positions of the propeller units, and a centralized pitch control unit operable upon the pitch shifting means for effecting constant speed operation of said propeller units, the pitch shifting means comprising a push-pull rod connected with the shiftable blades, a double acting hydraulic cylinder enclosed within the oscillatable mount of the propeller unit and having a piston connected with said push-pull rod, a fluid pressure source, a control valve for directing the fluid pressure source to the hydraulic cylinder, and means actuated by the centralized pitch control means for selecting the directed application of fluid pressure to the said cylinder.

10. In an aircraft having transversely extending sustaining surfaces and propeller units oscillatable from a vertical thrust position beneath the sustaining surfaces to a horizontal thrust position behind the sustaining surfaces, the combination of pitch shiftable blades on each of said propeller units, pitch shifting means in each propeller unit for shifting the pitch of said blades in all oscillated positions of the propeller units, and a centralized pitch control unit operable upon the pitch shifting means for effecting constant speed operation of said propeller units, the pitch control unit comprising an engine driven pump and governor, a fluid operated motor, a valve plunger operated by the governor for directing pressure fluid delivered by the pump to either side of the motor, a pair of pitch change output shafts, and a differential gearing coupling the fluid motor with the pitch change output shafts.

11. In an aircraft having sustaining surfaces and movable control surfaces, the combination comprising, primary propeller units oscillatable on a transverse axis from a vertical thrust position beneath the sustaining surfaces to a horizontal thrust position behind the same, said propeller units comprising a hub, pitch shiftable blades journalled in said hub, a trunnion head journalled for oscillation in the control surface, a propeller shaft journalled in the trunnion head and supporting the hub, hydraulically operated pitch shifting means for each propeller unit disposed within each trunnion head, said trunnion head being sealed to provide a fluid reservoir enclosing the pitch shifting means, and a pitch shift input control member for directing the operation of said pitch shifting means.

JOSEPH STUART, III.

REFERENCES CITED

The following references are of record in the file of this patent:

UNITED STATES PATENTS

| Number | Name | Date |
| --- | --- | --- |
| 1,007,810 | Snyder | Nov. 7, 1911 |
| 1,414,241 | Wells | Apr. 25, 1922 |
| 1,871,015 | Squires | Aug. 9, 1932 |
| 1,950,915 | Lado-Bordowsky | Mar. 13, 1934 |
| 1,971,734 | Stalker | Aug. 28, 1934 |
| 1,977,392 | Mackenzie | Oct. 16, 1934 |
| 2,135,073 | Gerhardt et al. | Nov. 1, 1938 |
| 2,230,370 | Baynes | Feb. 4, 1941 |
| 2,280,654 | Mader | Apr. 21, 1942 |
| 2,284,902 | Hosford | June 2, 1942 |
| 2,350,126 | Pitcairn | May 30, 1944 |
| 2,359,265 | Hackethal et al. | Sept. 26, 1944 |
| 2,364,871 | Reissner | Dec. 12, 1944 |

FOREIGN PATENTS

| Number | Country | Date |
| --- | --- | --- |
| 421,051 | France | Dec. 10, 1910 |